(12) United States Patent
Austrheim et al.

(10) Patent No.: US 12,145,011 B2
(45) Date of Patent: Nov. 19, 2024

(54) SERVICE VEHICLE FOR EXTINGUISHING FIRE ON AND WITHIN AN AUTOMATED STORAGE AND RETRIEVAL SYSTEM AND A METHOD THEREOF

(71) Applicant: Autostore Technology AS, Nedre Vats (NO)

(72) Inventors: Trond Austrheim, Etne (NO); Ivar Fjeldheim, Haugesund (NO)

(73) Assignee: AutoStore Technology AS, Nedre Vats (NO)

( * ) Notice: Subject to any disclaimer, the term of this patent is extended or adjusted under 35 U.S.C. 154(b) by 993 days.

(21) Appl. No.: 17/059,272

(22) PCT Filed: May 20, 2019

(86) PCT No.: PCT/EP2019/062949
§ 371 (c)(1),
(2) Date: Nov. 27, 2020

(87) PCT Pub. No.: WO2019/233749
PCT Pub. Date: Dec. 12, 2019

(65) Prior Publication Data
US 2021/0213311 A1    Jul. 15, 2021

(30) Foreign Application Priority Data

Jun. 6, 2018  (NO) .................................... 20180782
Apr. 26, 2019 (NO) .................................... 20190553

(51) Int. Cl.
*B65G 1/04*    (2006.01)
*A62C 3/00*    (2006.01)
(Continued)

(52) U.S. Cl.
CPC .............. *A62C 3/002* (2013.01); *A62C 27/00* (2013.01); *B62D 55/08* (2013.01); *B65G 1/0464* (2013.01);
(Continued)

(58) Field of Classification Search
CPC .......................... B65G 1/0464; B65G 2207/22
See application file for complete search history.

(56) References Cited

U.S. PATENT DOCUMENTS 3,762,478 A * 10/1973 Cummins .............. A62C 27/00
                                          169/25
4,470,742 A    9/1984 Schindler
(Continued)

FOREIGN PATENT DOCUMENTS

CN    103770634       5/2014
CN    104800990 A     7/2015
(Continued)

OTHER PUBLICATIONS

Office Action issued in the counterpart Chinese Patent Application No. 201980037266.4, mailed on Sep. 23, 2021 (21 pages).
(Continued)

*Primary Examiner* — Mark C Hageman
(74) *Attorney, Agent, or Firm* — Baker Botts L.L.P.

(57) ABSTRACT

The invention concerns a service vehicle (2) for extinguishing fire on and within an automated storage and retrieval system (1) and a method for operating such a service vehicle (2). The service vehicle comprises caterpillar tracks (6, 7) allowing movement of the service vehicle across a rail system (108) and a fire extinguisher compartment (8) for containing firefighting equipment (3a).

15 Claims, 8 Drawing Sheets

(51) Int. Cl.
*A62C 27/00* (2006.01)
*B62D 55/08* (2006.01)
*B66F 9/06* (2006.01)
*B66F 9/18* (2006.01)
*G05D 1/00* (2006.01)

(52) U.S. Cl.
CPC ............... *B66F 9/063* (2013.01); *B66F 9/18* (2013.01); *G05D 1/0027* (2013.01); *G05D 1/0246* (2013.01); *B65G 1/0492* (2013.01); *B65G 2207/22* (2013.01)

(56) References Cited

U.S. PATENT DOCUMENTS

| | | | |
|---|---|---|---|
| 7,264,062 B1 * | 9/2007 | Ham | B62D 29/00 239/722 |
| 7,584,045 B2 * | 9/2009 | Peretz | G05D 1/0229 701/1 |
| 11,484,736 B2 * | 11/2022 | Austrheim | B65G 1/0464 |
| 11,701,531 B2 * | 7/2023 | Clarke | A62C 27/00 169/47 |
| 2011/0163588 A1 | 4/2011 | Burt et al. | |
| 2011/0232925 A1 | 9/2011 | Al-Axemi | |
| 2013/0112440 A1 | 5/2013 | Alsaif et al. | |
| 2013/0236278 A1 | 9/2013 | Beewen | |
| 2016/0031501 A1 | 2/2016 | Howe et al. | |
| 2016/0250959 A1 | 9/2016 | Blanchard | |
| 2016/0325932 A1 | 11/2016 | Hognaland | |
| 2017/0101263 A1 | 4/2017 | Schroer | |
| 2017/0137078 A1 | 5/2017 | Tseng | |
| 2017/0240087 A1 | 8/2017 | Swenson | |
| 2018/0134206 A1 | 5/2018 | Grivetti et al. | |
| 2019/0225436 A1 | 7/2019 | Lindbo et al. | |
| 2021/0162247 A1 * | 6/2021 | Kovalev | A62C 31/28 |

FOREIGN PATENT DOCUMENTS

| | | |
|---|---|---|
| CN | 106540391 A | 3/2017 |
| CN | 107466203 A | 12/2017 |
| DE | 202007003447 U1 | 5/2007 |
| DE | 102009017241 | 10/2010 |
| DE | 102016108643 | 11/2017 |
| DE | 102016212645 | 1/2018 |
| EP | 0913171 | 5/1999 |
| GB | 1410652 | 10/1975 |
| JP | 3204554 U | 6/2016 |
| NO | 317366 B1 | 10/2004 |
| TW | 201006743 A1 | 2/2010 |
| WO | WO82/04230 A1 | 12/1982 |
| WO | WO2005/097550 A2 | 10/2005 |
| WO | 2014/090684 A1 | 6/2014 |
| WO | 2015/104263 A2 | 7/2015 |
| WO | WO2015/140216 A1 | 9/2015 |
| WO | 2015/193278 A1 | 12/2015 |
| WO | 2017/148963 A1 | 9/2017 |

OTHER PUBLICATIONS

NOSR of Dec. 19, 2018.
NOSR of Nov. 26, 2019.
ISR of Aug. 2, 2019.
Office Action issued in U.S. Appl. No. 17/059,273 mailed on Feb. 8, 2022 (27 pages).
Schneider, Marc, Extended European Search Report for European patent application No. EP23206326.3, dated Feb. 12, 2024, 7 pages, published by the European Patent Office, Munich, Germany.

* cited by examiner

FIG. 8 ns which is described in WO2014/195901A1, the content of which is incorporated by reference.

SERVICE VEHICLE FOR EXTINGUISHING FIRE ON AND WITHIN AN AUTOMATED STORAGE AND RETRIEVAL SYSTEM AND A METHOD THEREOF

BACKGROUND

Technical Field

The present invention relates to a service vehicle for extinguishing fire on and within an automated storage and retrieval system and a method thereof.

Prior Art

FIGS. 1A and 2A disclose a typical prior art automated storage and retrieval system 1 with a framework structure 100. FIGS. 2A and 2B disclose a prior art container handling vehicle 201 operating the system 1 disclosed in FIGS. 1A and 2A, respectively.

The framework structure 100 comprises a plurality of upright members 102 and optionally one or more horizontal members 103 supporting the upright members 102. The members 102, 103 may typically be made of metal, e.g. extruded aluminum profiles.

The framework structure 100 defines i.a. a storage grid 104 comprising storage columns 105 arranged in rows. The storage columns 105 may contain storage containers 106 (also known as bins) stacked one on top of another to form stacks 107.

Each storage container 106 may typically hold a plurality of product items (not shown), and the product items within a storage container 106 may be identical or may be of different product types depending on the application.

The storage grid 104 guards against horizontal movement of the containers 106 in the stacks 107, and guides vertical movement of the containers 106, but does normally not otherwise support the storage containers 106 when stacked.

The framework structure 100 further comprises a rail system 108 arranged in a grid pattern across the top of the storage grid 104 along a horizontal plane P, on which rail system 108 a plurality of container handling vehicles 200, 300 (as exemplified in FIGS. 1B and 2B) are operated to raise storage containers 106 from, and lower storage containers 106 into, the storage columns 105, and also to transport the storage containers 106 above the storage columns 105. The horizontal extension of one of the grid cells 122 constituting the grid pattern is shown in FIGS. 1A and 2A (marked by thick lines).

Each grid cell 122 has a width which is typically within the interval of 30 to 150 cm, and a length which is typically within the interval of 50 to 200 cm. The grid opening 115 of each grid cell 122 has a width and a length which is typically 2 to 10 cm less than the width and the length of the grid cell 122 due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines grid columns above which the container handling vehicles 200,300 can move laterally above the storage columns 105, i.e. in a plane which is parallel to the horizontal X-Y plane.

Each prior art container handling vehicle 200,300 comprises a vehicle body/framework and a wheel arrangement of eight wheels 201,301, where a first set of four wheels enable the lateral movement of the container handling vehicles 200,300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 200,300 so that the position of the gripping/engaging devices with respect to the vehicle 200,300 can be adjusted in a third direction Z orthogonal the first direction X and the second direction Y.

Conventionally, and also for the purpose of this application, Z=1 identifies the uppermost layer of the storage grid 104, i.e. the layer immediately below the rail system 108, Z=2 the second layer below the rail system 108, Z=3 the third layer etc. In the exemplary prior art storage grid 104 disclosed in FIGS. 1A and 2A, Z=8 identifies the lowermost, bottom layer of the storage grid 104. Consequently, as an example, and using the Cartesian coordinate system X, Y, Z indicated in FIGS. 1A and 2B, the storage container identified as 106' in FIG. 1A and FIG. 2A can be said to occupy grid location or cell X=10, Y=2, Z=3. The container handling vehicles 200,300 can be said to travel in layer Z=0, and each grid column can be identified by its X and Y coordinates.

Each container handling vehicle 200,300 comprises a storage compartment or space (not shown) for receiving and stowing a storage container 106 when transporting the storage container 106 across the rail system 108.

The storage space may comprise a cavity arranged centrally within the vehicle body, e.g. as is described in WO2014/090684A1, the contents of which are incorporated herein by reference.

Alternatively, the container handling vehicles 300 may have a cantilever construction, as is described in NO317366, the contents of which are also incorporated herein by reference.

The container handling vehicles may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles may have a footprint which is larger than the lateral area defined by a grid column, e.g. as is disclosed in WO2014/090684A1.

In a storage grid 104, a majority of the grid columns are storage columns 105, i.e. grid columns where storage containers 106 are stored in stacks 107. However, a storage grid 104 normally has at least one grid column which is used not for storing storage containers 106, but which comprises a location where the container handling vehicles 200,300 can drop off and/or pick up storage containers 106 so that they can be transported to an access station (not shown) where the storage containers 106 can be accessed from outside of the storage grid 104 or transferred out of or into the storage grid 104. Within the art, such a location is normally referred to as a "port" and the grid column in which the port is located may be referred to as a "port column" 119,120.

The storage grids 104 in FIGS. 1A and 2A comprise two port columns 119 and 120. The first port column 119 may for example be a dedicated drop-off port column where the container handling vehicles 200,300 can drop off storage containers 106 to be transported to an access or a transfer station, and the second port column 120 may be a dedicated pick-up port column where the container handling vehicles 200,300 can pick up storage containers 106 that have been transported to the storage grid 104 from an access or a transfer station.

For monitoring and controlling the automated storage and retrieval system 1 (e.g. monitoring and controlling the location of respective storage containers 106 within the storage grid 104; the content of each storage container 106; and the movement of the container handling vehicles 200, 300 so that a desired storage container 106 can be delivered to the desired location at the desired time without the container handling vehicles 200,300 colliding with each other), the automated storage and retrieval system 1 comprises a control system (not shown) which typically is computerized and which typically comprises a database for keeping track of the storage containers 106.

In some implementations of such known automated storage and retrieval systems 1, there can be a large number of container handling vehicles 200,300 running on a single grid 104 and a corresponding large number of charging stations for charging of batteries within the vehicles 200,300, providing a high amount of electric power energy. Both the container handling vehicles 200,300 and the charging stations may experience various mechanical and electrical problems. Furthermore, the storage containers 106 within the storage grid 104 may contain a large amount of combustible materials.

All these factors contribute to increase a fire hazard during operation of the automated storage and retrieval system 1. For example, one container handling vehicle 200,300 could potentially experience a fault that may ignite the content within one or more of the storage containers 106.

Moreover, there may be spillages or a build-up of dirt, dust or hydrocarbons on the storage grid 104 which in the event of a spark being generated by a container handling vehicle 200,300 or a charging station could potentially cause a fire to start. For example, the spark may be initiated by friction between the rail system 108 and the wheels 201,301 of the container handling vehicle 200,300.

It is a disadvantage of the prior art systems that in order to extinguish a fire within or above the storage grid, it must be accessed by human fire fighters. For the fire fighters' safety, it is necessary to stop movements of all container handling vehicles on the rail system before access may be allowed.

Any delay between detection of a fire and the positioning of human fire fighters can cause unnecessary damage to the storage grid and its contents and surrounding equipment.

False alarms, i.e. when no fire is present, may cause all the container handling vehicles on the rail system to be stopped to allow human fire fighters access. Such shutdowns are costly and affects negatively the productivity of the system.

A need exists for firefighting means which can be rapidly and accurately deployed when a fire is detected, and which does not require all the container handling vehicles to stop the movements on the grid.

WO 2017 148963A1 discloses a service vehicle having fire extinguishing means and wheel arrangements similar to the wheel arrangements of the prior art container handling vehicles shown in FIG. 1B and FIG. 2B.

The known service vehicle is thus restricted to follow the underlying grid system, i.e. in the X and Y directions only, thereby constraining the movements on the rail system in the same way as that of the container handling vehicles, that is in a partly zigzag movement pattern from/to the fire extinguishing location. As a result, the time spent on the grid is increased. In addition, the zigzag movement pattern occupies a large amount of space during the fire extinguishing procedure.

In the case of automated storage and retrieval systems having a high density of container handling vehicles, such increase of space and time may significantly reduce the overall efficiency.

In view of the above, it is desirable to provide a service vehicle, an automated storage and retrieval system using such a service vehicle, and a method thereof, that solve or at least mitigate one or more of the aforementioned problems.

In particular, it is an object of the invention to provide a service vehicle capable of extinguishing a fire that may be transported to a location anywhere on the rail system in a time and space efficient way.

It is also an object of the invention to provide a service vehicle that may have a multifunctional purpose, i.e. which can provide additional service beyond extinguishing fire within or on the system.

It is further an object of the invention to provide a service vehicle that may handle a large span of fire incidences, e.g. from a small localized fire to a fire having been allowed to spread to a large volume.

It is yet a further object of the invention to provide a service vehicle that may be supported on a storage grid system, even when the grid system or rail system has been weakened and/or distorted due to the heat.

SUMMARY OF THE INVENTION

The present invention is set forth and characterized in the independent claims, while the dependent claims describe other characteristics of the invention.

In one aspect, the invention concerns a service vehicle suitable for extinguishing fire on and within an automated storage and retrieval system.

The system comprises a rail system comprising a first set of parallel rails arranged in a horizontal plane P and extending in a first direction X and a second set of parallel rails arranged in the horizontal plane P and extending in a second direction Y which is orthogonal to the first direction X. The first and second sets of rails form a grid pattern in the horizontal plane P comprising a plurality of adjacent grid cells of grid cell length $L_{gc}$ and grid cell width $W_{gc}$, each comprising a grid opening defined by a pair of adjacent rails of the first set of rails and a pair of adjacent rails of the second set of rails.

The system may also comprise a plurality of stacks of storage containers arranged in storage columns located beneath the rail system and a plurality of container handling vehicles for lifting and moving storage containers stacked in the stacks. The container handling vehicles may be configured to move laterally on the rail system above the storage columns to access the storage containers via the storage grid openings.

The service vehicle comprises propulsion means or propulsion device allowing movement of the service vehicle across the rail system and a fire extinguisher compartment for containing firefighting equipment, for example a complete set allowing independent fire-fighting and/or one or some parts of a complete set allowing fire-fighting in collaboration with other service vehicles containing firefighting equipment.

The propulsion means may comprise at least one, preferably two, caterpillar track(s), configured to drive on top of the rail system, i.e. abutting the topmost parts of each rail.

Alternatively, the propulsion means may comprise a plurality of cylindrical rollers having a length corresponding to the largest of the grid cell length $L_{gc}$ and the grid cell width $W_{gc}$.

If caterpillar track(s) are used, it/they may have a length $L_{pm}$ at the level of the horizontal plane P that exceeds a length corresponding to a diagonal length across a maximum grid opening of the rail system when the service vehicle is moving across the rail system. Alternatively, the length $L_{pm}$ may be defined as the length between the center of circular drive discs placed at two opposite sides of the caterpillar track(s). More preferably, the length $L_{pm}$ exceeds the largest of the length $L_{gc}$ and the width $W_{gc}$ of two grid cells.

The propulsion means have preferably an overall width $W_{pm}$ exceeding the maximum grid cell width $W_{gc}$ when the service vehicle is moving on the rail system, more preferably an overall width $W_{pm}$ exceeding two times the maximum grid cell width $W_{gc}$, for example three times the maximum grid cell width $W_{gc}$.

The caterpillar track(s) preferably comprises a longitudinal extending endless belt and a belt motor driving the endless belt.

The propulsion means may further comprise a first caterpillar track comprising a longitudinally extending endless belt and a second caterpillar track comprising a longitudinally extending endless belt directed parallel to the endless belt of the first caterpillar track. In this exemplary configuration the first caterpillar track and the second caterpillar track are preferably spaced apart by a gap $G_{pm}$ in a direction of the rotational axis of the endless belts, where the gap $G_{pm}$ has a width being at least the maximum grid cell width $W_{gc}$ of the rail system or at least the maximum grid cell length $L_{gc}$ of the rail system.

In a preferred exemplary configuration, the service vehicle further comprises a registration or inspection unit being configured to allow inspection such as visual inspection of the surroundings of the service vehicle to detect possible fire or precursors to fire. The inspection unit may also comprise components such as transmitters/transducers to allow inspection data to be sent to a remote control system for further analyses.

Moreover, the inspection unit may comprise a front inspection unit being arranged to allow inspection of the surroundings of the service vehicle within a set angular range around a forward direction of propulsion of the service vehicle and/or a back inspection unit being arranged to allow inspection of the surroundings of the service vehicle within a set angular range around a backward direction of propulsion of the service vehicle. If both a front and a back inspection unit is used, the back inspection unit should be directed in opposite direction of the forward direction along the horizontal plane P.

The inspection unit may be a first optical camera for capturing still or moving images of the surroundings of the service vehicle using light in the visible spectrum and/or a second optical camera for capturing still or moving images of the surroundings of the service vehicle using light outside the visible spectrum. The second optical camera may for example be a thermal imaging camera.

In a second aspect, the invention concerns a fire extinguisher assembly comprising a service vehicle in accordance with any of the features of the first aspect and a fire extinguisher device for extinguishing fire on and beneath the rail system using fire extinguishant.

The fire extinguisher device may comprise fire extinguisher structure being either a tank containing fire extinguishant, preferably pressurized fire extinguishant, or a fire extinguisher framework.

The service vehicle may further comprise a service vehicle body or framework onto which the propulsion means are mounted, preferably on opposite sides of the vehicle body.

In the second aspect the service vehicle body may be designed such that it encloses a fire extinguisher compartment for storing a fire extinguisher structure such as the tank or the fire extinguisher framework.

The fire extinguisher compartment is preferably also configured to store a container handling vehicle operable on the rail system.

The fire extinguisher device may further comprise a pump for pressurizing the fire extinguishant within the tank and a closable manifold such as one or more valves, forming a closable fluid communication between an internal volume of the tank and the exterior of the tank.

The fire extinguisher device may further comprise a fire extinguisher support arranged at or adjacent to an exterior wall of the tank, for example to create a stable support of the tank when the tank is in a parking position on the rail system.

As an exemplary configuration only, the support may be a cradle adapted to receive the tank such that lateral movements are at least partly prevented and with an underside aligned parallel to the rail system to provide for a stable support.

The service vehicle body may further comprise a support bracket extending into the fire extinguisher compartment. The fire extinguisher support and the support bracket(s) may be mutually configured such that the fire extinguisher support is supported on the support bracket when the tank is arranged within the fire extinguisher compartment.

If the fire extinguisher structure is a fire extinguisher framework, the framework is preferably configured such that it forms an internal volume or cavity that is equal or smaller than the external volume of the fire extinguisher compartment.

The fire extinguisher device may further comprise a supply hose for supplying fire extinguishant.

A first end of the supply hose may in this exemplary configuration be connected in fluid communication with a fire extinguishant reservoir, for example a bigger tank arranged adjacent to the framework structure. The second end of the supply hose may be connected to the framework such that fire extinguishant is allowed to exit the supply hose and onto the rail system during operation through an opening of the second end arranged in the vicinity of, or within, the service vehicle body. The opening may for example be an adjustable nozzle to allow adjustable fluid flow.

The term 'vicinity' is herein defined as a location less than the width of the service vehicle body.

In order to allow a desired positioning of the opening, the fire extinguishing structure may further comprise a positioner, for example by aid of a dedicated motor configured to both activate and regulate the position. The same motor, or an additional motor, may be used to regulate the flow of fire extinguishant from the opening/nozzle. Alternatively, the hose end or the nozzle may be fixed, for example directly onto the service vehicle body.

The fire extinguishing device may further comprise a drum onto which the supply hose may be coiled to allow storage of sufficient length of hose at the rail system and to facilitate the transport of the service vehicle to the location of the fire. The drum is preferably arranged at or near the lateral periphery of the rail system.

The service vehicle body may comprise a lifting mechanism for vertically lifting the fire extinguisher structure such as the tank (with or without the tank support) or the framework when stored within the fire extinguisher compartment. The same lifting mechanism may preferably also be suitable for lifting a container handling vehicle arranged within the service vehicle body.

In a third aspect, the invention concerns a method for operating a fire extinguisher assembly comprising a service vehicle and a fire extinguisher device.

The service vehicle may comprise a caterpillar track, preferably two caterpillar tacks, or a plurality of cylindrical rollers, allowing movement of the service vehicle across a rail system.

The fire extinguisher device is configured to extinguish fire on and beneath the rail system using fire extinguishant, which preferably is pressurized, and comprises in this third aspect a positioner for directing the fire extinguishant towards a predetermined direction.

The method comprises the following steps:
guiding the service vehicle to a first position on the rail system situated within a maximum distance D from an outer lateral boundary of a fire located on or below the rail system by operating and controlling the propulsion means,
activating the fire extinguishing device for allowing the fire extinguishant to extinguish the fire and
positioning the positioner to direct the fire extinguishant towards or adjacent to the fire.

The maximum distance D may for example be less than 100% of a maximum lateral extend of the fire.

The fire extinguisher assembly in the above-mentioned method is preferably the fire extinguisher assembly according to the second aspect of the invention.

The use of a service vehicle having caterpillar track(s) or cylindrical rollers as propulsion means provides several advantages in view of the prior art.

The use of caterpillar track(s) or cylindrical rollers instead of wheels guided by the rails will avoid zigzag routing across the rail system, thereby allowing a more time efficient operation.

Further, the caterpillar track(s) or cylindrical rollers will spread the weight of the service vehicle and the part of the fire extinguisher device connected to the service vehicle across several grid cells, i.e. extending beyond the four adjacent vertical pillars below a single grid cell, as it travels across the rail system. This weight distribution over a larger area of the rail system is particularly important when there is a fire and the strength of the framework structure, and in particular the upright members and/or the horizontal members of the storage grid, is compromised.

The fire induced heat may also cause the rail system to buckle, thereby creating movement difficulties for vehicles having wheels that must engage the rail tracks.

The wider footprint provided by the caterpillar track(s) or cylindrical rollers will also provide greater stability for the vehicle. When travelling diagonally or partly diagonally across the rail system and unreeling the supply hose in the process, any resistance imposed by the supply hose will be in the direction of travel rather than obliquely, which in the case of a smaller vehicle, e.g. a single cell vehicle, might cause the vehicle to be pulled over through the tension in the supply hose.

BRIEF DESCRIPTION OF THE DRAWINGS

The following drawings are appended to facilitate the understanding of the invention.

FIGS. 1 and 2 are perspectives view of a prior art automated storage and retrieval system, where FIG. 1A and FIG. 2A shows the complete system and FIG. 1B and FIG. 2B shows examples of system operable prior art container handling vehicles.

FIGS. 3A, B and C are perspective views of a fire extinguisher assembly according to a first embodiment of the invention operating on a rail system of an automated storage and retrieval system, where FIGS. 3A and B shows the service vehicle approaching a fire extinguishing tank and the service vehicle containing the fire extinguishing tank, respectively and FIG. 3C shows a part of FIG. 3B in further details.

FIGS. 4A and B are two perspective views of the service vehicle according to the invention, containing a container handling vehicle.

FIGS. 5A and B are perspective views of an automated storage and retrieval system with a fire extinguisher assembly in accordance with a second embodiment of the invention, where FIG. 5A shows a fire extinguisher device and a container handling vehicle and FIG. 5B shows a service vehicle according to the invention approaching the fire extinguisher device.

FIGS. 7A and B are perspective views of a service vehicle according to the second embodiment of the invention operating on a rail system of an automated storage and retrieval system, where FIG. 7A shows the service vehicle containing the fire extinguisher structure with the connected supply hose and FIG. 7B shows the supply hose connected to the fire extinguisher structure parked by the service vehicle.

FIGS. 8A and B are perspective views of the fire extinguisher structure in a parked position on the rail system and within the service vehicle according to the invention, respectively.

In the drawings, the same reference numerals have been used to indicate like parts, elements or features unless otherwise explicitly stated or implicitly understood from the context.

DETAILED DESCRIPTION OF THE INVENTION

In the following, embodiments of the invention will be discussed in more detail with reference to the appended drawings. It should be understood, however, that the drawings are not intended to limit the invention to the subject-matter depicted in the drawings.

Figure 1:
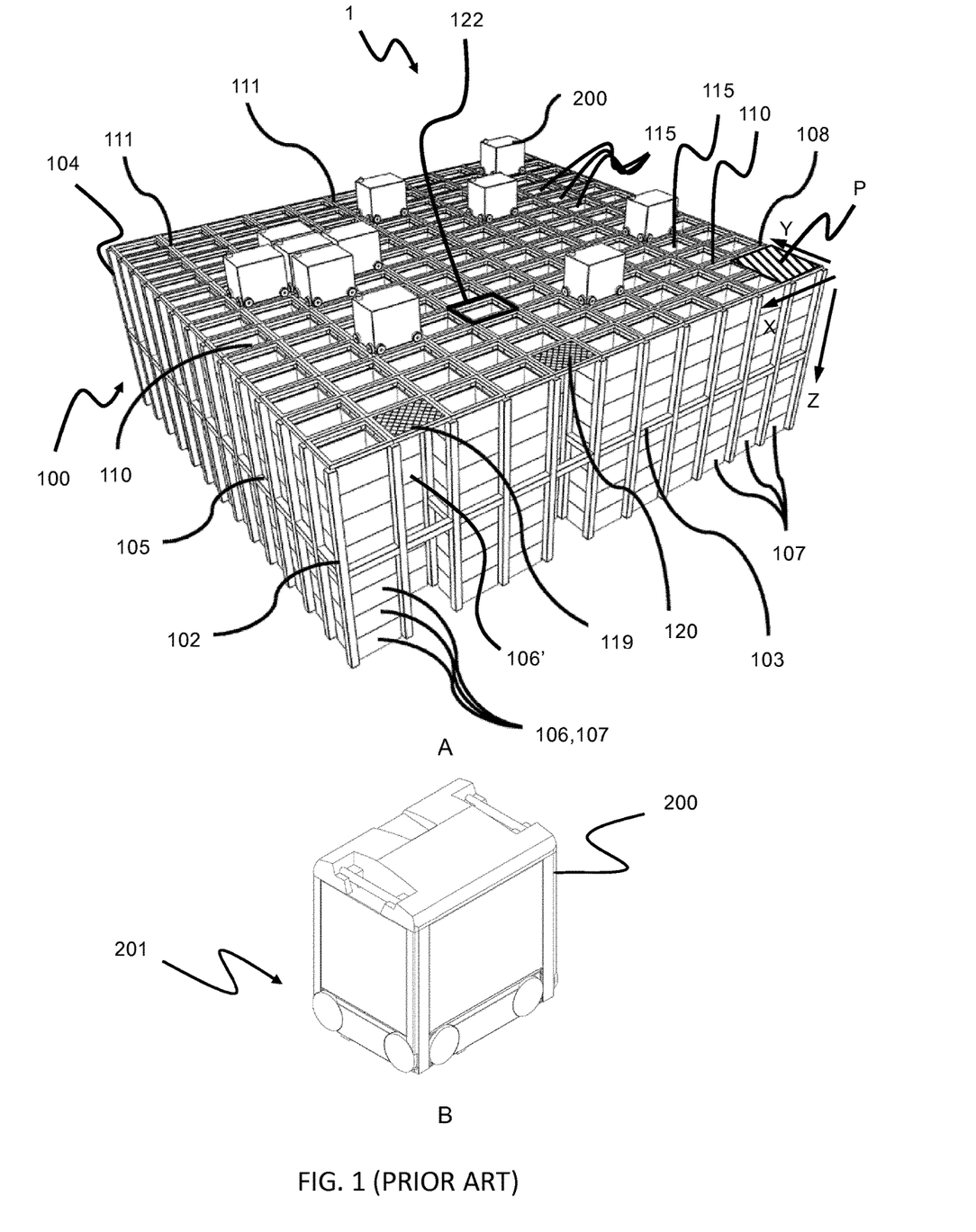
Figure 2:
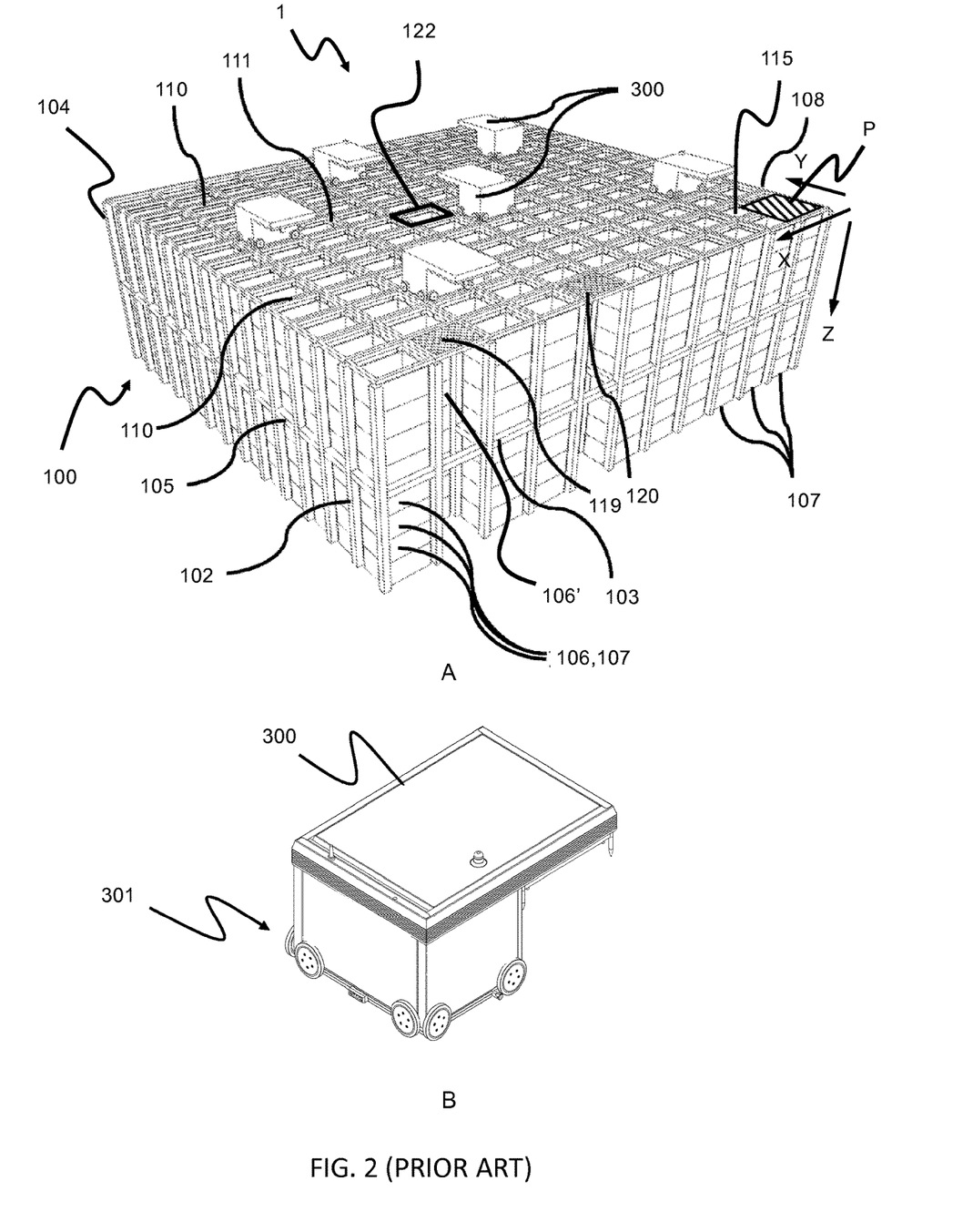

With reference to FIGS. 1 and 2 the storage grid 104 of each storage structure 1 forming part of a framework structure 100 contains in total 1144 grid cells, where the width and length of the storage grid 104 corresponds to the width and length of 143 grid columns. The top layer of the framework structure 100, above the storage grid 104, is a rail system 108 onto which a plurality of container handling vehicles 200,300 are operated.

The framework structure 100 of the inventive automated storage and retrieval system 1 is constructed in accordance with the prior art framework structure 100 described above, i.e. a plurality of upright members 102 and one or more horizontal members 103 which are supported by the upright members 102.

The rail system 108 above the storage grid 104 comprises parallel rails 110,111 in the X direction and the Y direction, respectively, arranged across the top of storage columns 105 containing stacks 107 of storage containers 106. The horizontal area of a single grid cell 122, i.e. along the X and Y directions, may be defined by the distance between adjacent rails 110 and 111, respectively. In FIGS. 1 and 2, such a grid cell 122 is marked on the rail system 108 by thick lines. Each grid cell 122 may be described with a grid cell width $W_{gc}$ and a grid cell length $L_{gc}$.

The rail system 108 allows the container handling vehicles 200,300 to move horizontally between different grid locations in an accurate and stable manner.

Each grid location is associated with a grid cell 122.

In FIGS. 1 and 2 the storage grid 104 is shown with a height of eight cells. It is understood, however, that the storage grid 104 can in principle be of any size. In particular, it is understood that the storage grid 104 can be considerably wider and/or longer than disclosed in FIGS. 1 and 2. For example, the storage grid 104 may have a horizontal extension of more than 700×700 grid cells 122. Also, the grid 104 can be considerably deeper than disclosed in FIGS. 1 and 2. For example, the storage grid 104 may be more than ten grid cells deep.

The storage container vehicles 200,300 may be of any type known in the art, e.g. any one of the automated container handling vehicles disclosed in WO2014/090684A1, in NO317366 or in WO2015/193278A1.

Figure 3:
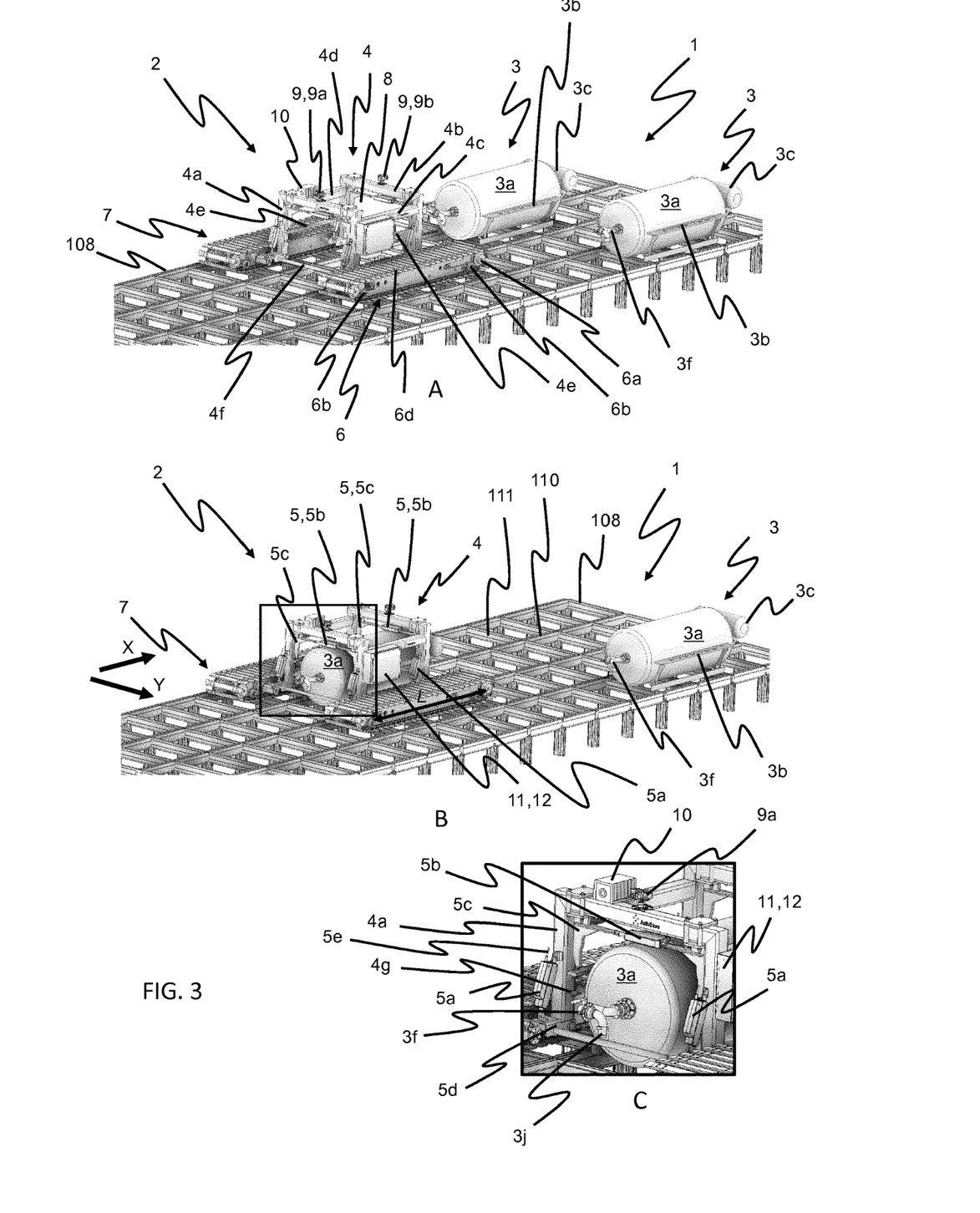

FIG. 3 an FIGS. 5-8 show respectively a first and a second embodiment of a fire extinguisher assembly 2,3 arranged on the rail system 108 for allowing firefighting in case of fire on or within the framework structure 100.

For both embodiments, the fire extinguisher assembly 2,3 includes a service vehicle 2 being configured to move on top of the rail system 108 and a fire extinguisher device 3 for extinguishing fire.

The service vehicle 2 comprises a service vehicle body 4 and two caterpillar tracks 6,7 mounted on opposite vertical sides of the service vehicle body 4 set up by a front framework 4a, a back framework 4b and a first and a second horizontal cross beam 4c,4d interconnecting the front and back frameworks 4a,4b, preferably in a rigid connection.

Further, the service vehicle body 4 may comprise two guiding beams 4e arranged parallel to, and below, the first horizontal cross beam 4c and the second horizontal cross beam 4d, four support brackets 4g mutually distributed in the same horizontal plane on both inward facing sides of the front and back frameworks 4a,4b, below the guiding beams 4e, and a stopper beam 4f extending across the lower part of the back framework 4b. The front framework 4a has no beams at its lower part.

The different components of the service vehicle body 4 described above are configured such that they together form the boundaries of an inner chamber 8 into which a fire extinguisher device 3 and/or a container handling vehicle 200,300 may be stored.

Each caterpillar track 6,7 comprises an endless belt 6d of length L arranged at least partly below the vehicle body 4. The length L is measured as the length of the belt 6d contacting the rail system 108 during operation, i.e. the length measured at a vertical level corresponding to the level where the belts abuts the rail system 108.

Each of the caterpillar tracks 6,7 is in the embodiments shown driven by aid of a belt motor and toothed belt wheels 6a,6b arranged within the belts 6d at both belt ends. In one exemplary configuration a common belt motor may be used for both belts 6d.

The first and second caterpillar tracks 6,7 are arranged symmetrically around a vertical center plane of the service vehicle 2 in its direction of movement and protrudes at least partly from the horizontal extremity of the vehicle body 4.

The first toothed belt wheel 6a are arranged at the terminal end (front and rear) within the chains 6d and has a diameter sufficiently large to mesh with both the lower and upper parts of the chain 6d. The second toothed belt wheel 6b has in the example a smaller diameter than the first toothed belt wheel 6a and is arranged to mesh with the lower parts of the chains 6d at a location further towards the longitudinal center of the caterpillar tracks 6,7.

For the particular configuration shown in the figures, the above-mentioned length L of the endless belt 6d may be defined as the length between the center point of the first toothed belt wheel 6a at the front end and the center point of the first toothed belt wheel 6a at the rear end.

Note that the terms "upper" and "lower" are measured relative to the underlying rail system 108.

The looped chains 6d constituting the two caterpillar tracks 6, 7, i.e. one chain 6d for each caterpillar tracks 6,7, are preferably made of a resilient material capable which does not inflict damages when moving in contact with top surfaces of the rails 110, 111. For example, each chain 6d may be at least partly made of, or covered by, an elastomer such as polyoxymethylene (POM). Alternatively, or in addition, the top surfaces may be covered by the same or similar materials.

One or more of the toothed belt wheels 6a,6b, and/or one or both of the belts 6d, are connected to a driving mechanism comprising a driving motor (not shown). For example; one or both of the first toothed belt wheel(s) 6a of one or both of the belts 6d may function as a drive wheel which engages and drives its respective caterpillar tracks 6,7. Further, a second driving motor may alternatively or in addition be connected to one or both of the second toothed belt wheels 6b for one or both of the caterpillar tracks 6,7.

By the particular arrangement of the caterpillar tracks 6,7 described above, the service vehicle 2 is allowed to move horizontally in any direction on the rail system 108.

The movement may be controlled remotely by a transducer or receival system 11 located onboard the service vehicle 2 which receives signals from a remote-control system.

The service vehicle 2 may comprise a battery 12, which in the appended drawings are illustrated arranged in a box together with the transducer/receiver system 11. The battery 12 may however be arranged anywhere on the service vehicle 12. Further, the service vehicle 2 may be configured such that its battery 12 is automatically replaceable, i.e. without the need for human intervention. An example of such an automatic battery exchange system may be found disclosed in WO2015104263, hereby incorporated by reference.

The length L of both caterpillar tracks 6,7 may extend over several grid cells 122 to ensure stable operations on the rail system 108 in all horizontal directions, i.e. all direction within the horizontal plane P.

Further, the service vehicle 2 may be equipped by a first inspection unit 9 or registration unit 9 configured to inspect/register the surroundings of the service vehicle 2. The inspection unit 9 may for example be an image capturing unit 9 comprising a forward camera 9a and a rearward camera 9b as illustrated in the figures. Alternatively, or in addition, the inspection unit 9 may be one or more rotatable cameras. The image capturing unit 9 may be any optical instrument for recording or capturing images. The images or films may be stored in a storage medium within the service vehicle 2, transmitted to remote location, or a combination thereof.

The image capturing unit 9 may be controlled and visualized from a monitor located distant from the framework structure 100.

The service vehicle 2 may alternatively, or in addition, comprise a second inspection unit 10 or registration unit 10 configured to inspect/register the surroundings of the service vehicle 2 acquiring information different from the information acquired from the first inspection unit 9. For example, the second inspection unit 10 may be an infrared camera or a thermographic camera allowing inspection of heat variations on and within the framework structure 100.

In the accompanying figures, both types of inspection units 9,10 are shown on top of the service vehicle body 4 to ensure maximum line of sight. However, the inspection units 9,10 may be placed anywhere on the service vehicle 2, and in any number, as long as they allow the environment around the service vehicle 2 to be inspected/observed.

With particular reference to FIG. 3C, the service vehicle 2 may further comprise a lifting mechanism 5 which includes one or more vertical linear actuators 5a. Each of these actuators 5a may have one end connected to a pivot support 5d pivotally couples to the service vehicle body 4 with a rotational axis parallel to the underlying rail system 108 and the other end to a higher situated part of the service vehicle body 4.

The lifting mechanism 5 may further include lifting claws 5c arranged on the front and rear framework 4a,4b above the guiding beams 4e. The lifting claws 5c are displaceable in a horizontal direction relative to the service vehicle body 4 by use of horizontal linear actuators 5b.

The lifting mechanism 5 may be remotely operated via one or more onboard transducers/receivers 5e.

All operations of the service vehicle 2 are preferably performed fully remote, that is, without any need for a human operator to directly interact with the propulsion means and any other equipment onboard the vehicle 2 during operation.

FIG. 3 shows a first embodiment of the fire extinguisher assembly 2,3 comprising a service vehicle 2 as described above and a fire extinguisher device 3 including
  a cylindrical tank 3a for containing pressurized fire extinguishant such as water or foam,
  a fire extinguisher support 3b or cradle 3b into which the tank 3a is arranged,
  a pump 3c for allowing a predetermined pressure within the tank 3a,
  a valve 3f for allowing closeable release of the pressurized fluid extinguishant to the surroundings of the tank 3a and
  a discharge opening 3j from which the fire extinguishant may be released.

The discharge opening 3j may be an adjustable nozzle 3j allowing control of flow rate of fire extinguishant. Closing/opening of the valve 3f may preferably be performed remotely by activating a motor via a transducer/receiver.

Furthermore, the position of the discharge opening/nozzle 3j may preferably also be remotely adjusted, for example by rotating the opening 3j by one or more motorized swivels (not shown) situated next to the valve 3f via transducers/receivers.

FIG. 3A shows the service vehicle 2 driving in directions towards a cylindrical tank 3a filled with pressurized fire extinguishant. The tank 3a is shown parked within a cradle 3b having two horizontal plates extending on opposite sides along the longitudinal length of the tank 3a.

As best seen in FIG. 3B, wedged ends of the guiding beams 4e ensures that the cradle 3b are correctly aligned when the tank and cradle assembly 3a,3b enters the chamber 8.

During a firefighting operation the following steps may be performed:

With reference to FIG. 3B, the service vehicle 2 moves forward until one of the longitudinal ends of the cylindrical tank 3a abuts the stopper beam 4f.

The horizontal plates of the cradle 3b are configured such that they are situated just above the four support brackets 4g.

The vertical actuators 5a of the lifting mechanism 5 is then activated, raising the service vehicle body 4 relative to the caterpillar tracks 6,7. When the upper face of the support brackets 4g abuts the lower face of the horizontal plates of the cradle 3b, the tank-cradle assembly 3a,3b is lifted above the rail system 108.

If needed, the tank-cradle assembly 3a,3b may be further stabilized by activating the linear actuators 5b, thereby pushing the claws 5c towards the tank 5a on both sides.

When a fire has been observed and/or measured, the service vehicle 2 collects a tank 3a with pressurized fire extinguishant standing in a parked position within a cradle 3b at the periphery of the rail system 108. The first and/or second inspection unit 9,10 detects the position of a fire and the service vehicle 2 is remotely guided, or is autonomously transferred, to a position within a set area outside the external boundaries of the fire zone. The discharge opening 3j is positioned by the motorized swivel and the valve 3f is opened, thereby releasing the fire extinguishant in direction towards the source of the fire with a set flow rate measured in cubic meter per second.

The tank 3a can be of any size that enables the service vehicle 2 to contain the tank 3a within a fire extinguisher compartment 8 set by the service vehicle body 4.

FIGS. 5-8 shows a second embodiment of the fire extinguisher assembly 2, 3 comprising a service vehicle 2 as described above and a fire extinguisher device 3 including
  a fire extinguisher structure 3a for containing fire extinguisher equipment 3f,3d,
  a supply hose 3e having one end with a discharge opening coupled at least indirectly to the fire extinguisher structure 3a and the other end to a fire extinguisher reservoir,
  a drum 3g onto which the supply hose 3e is winded and
  a drum support 3h arranged on the periphery of the rail system 108 supporting the drum 3e.

The discharge opening 3j for discharging/releasing fire extinguishant may be an adjustable nozzle 3j allowing control of flow rate of the fire extinguishant.

With particular reference to FIG. 8B, the position of the discharge opening/nozzle 3j fixed at least indirectly to the supply hose 3e may be remotely adjusted, for example by adjusting a nozzle positioner 3i such as a telescopic arm, a swivel or a pivot device by use of a nozzle positioner motor 3k, where both the nozzle positioner 3i and its motor is fixed to the fire extinguisher structure 3a.

In the accompanied drawings the nozzle positioner 3*i* is exemplified as a linear arm having one end fixed to a pivot arm which again is attached to the nozzle 3*j*, thereby activating a pivot movement on the nozzle 3*j*.

Other arrangement may be envisaged by a person skilled in the art to ensure other movement patterns, for example linear movements using linear actuators.

The flow rate of fire extinguishant from the nozzle 3*j* may be achieved by for example rotating the nozzle 3*j* using one or more dedicated motorized swivels (not shown), thereby regulating the size of the nozzle opening.

As for the first embodiment, any control of the nozzle positioner 3*k* and/or the flow rate may be achieved by transducers/receivers arranged on the service vehicle 2 and/or the fire extinguisher structure 3*a*.

The fire extinguisher structure 3*a* may be a framework of beams enclosing one or more compartments for installing fire extinguisher equipment such as described above.

Again, with particular reference to FIG. 8B, the fire extinguisher structure 3*a* includes horizontal beams arranged at both sides of the upper part of the structure 3*a* along the direction of travel of the service vehicle 2. The main purpose of these horizontal beams is to ensure sufficient pressure force upon contact with the claws 5*c* due to the operation of the horizontal actuators 5*b*, thereby allowing lifting of the fire extinguisher structure 3*a* by the activation of the vertical actuators 5*a*.

Alternatively, or in addition, the vertical displacement of the fire extinguisher structure 3*a* can be achieved by arranging horizontal protruding plates on the structure 3*a* which is configured such that they abut support brackets 4*g* during activation of the vertical actuators 5*a* similar to the above described method for lifting the tank-support assembly 3*a*,3*b* of the first embodiment.

During a firefighting operation the following steps may be performed:

When a fire has been observed and/or measured on or below the rail system 108, the service vehicle 2 collects a fire extinguisher structure 3*a* situated at the periphery of the rail system 108.

The fire extinguisher structure 3*a* contains the discharge opening/nozzle 3*j* attached (at least indirectly) to the supply hose 3*e*, the nozzle positioner 3*j* and the nozzle positioner motor 3*k*. The supply hose 3*e* is coiled onto the drum 3*g*.

As for the first embodiment, wedged ends of the guiding beams 4*e* within the service vehicle body 4 ensures that the fire extinguisher structure 3*a* are correctly aligned when it enters the chamber 8. At entry, the horizontal beams of the structure 3*a* are situated at a vertical level corresponding to the vertical level of the claws 5*c*. Alternatively, or in addition, any horizontal plates protruding from the structure 3*a* may be situated immediately above the four support brackets 4*g*.

With reference to FIGS. 5-8 the service vehicle 2 moves forward until the structure 3*a* abuts the stopper beam 4*f*. The structure 3*a* is then lifted as exemplified above.

The first and/or second inspection unit 9,10 detects the position of a fire and the service vehicle 2 is remotely guided, or is autonomously transferred, to a position within a set area outside the external boundaries of the fire zone. The discharge opening/nozzle 3*j* is positioned by adjusting the nozzle positioner 3*i* using the nozzle positioner motor. The fire extinguishant is then released by releasing pressurized fire extinguishant within the supply hose 3*e* or feeding fire extinguishant form a fire extinguishant reservoir with a certain flow rate. As for the first embodiment, the nozzle 3*j* may be adjustable, allowing control of the flow rate discharged from the nozzle 3*j*.

Before or during the firefighting procedure at site, the service vehicle 2 may lower the fire extinguisher structure 3*a* such that it is in a parked position onto the rail system 108. Such a situation is depicted in FIG. 7B and FIG. 8A. The same service vehicle 2 may thus pick up another fire extinguisher device (a tank or a fire extinguisher structure) for extinguishing a fire at another location on or below the rail system 108.

The fire extinguishant can be any means of extinguishing a fire. For example, the fire extinguishant may be powder-based agents such as sodium bicarbonate, monoammonium phosphate, potassium bicarbonate or potassium chloride. The fire extinguishant may alternatively or in addition be foams such as aqueous film-forming foam, alcohol-resistant aqueous film-forming foams, compressed air foam systems, Arctic Fire, FireAde or Cold Fire. However, in a preferred embodiment the fire extinguishant is of water types such as air-pressurized water, water mist or water with water additives (potassium acetate, potassium carbonate and/or potassium citrate).

Figure 4:
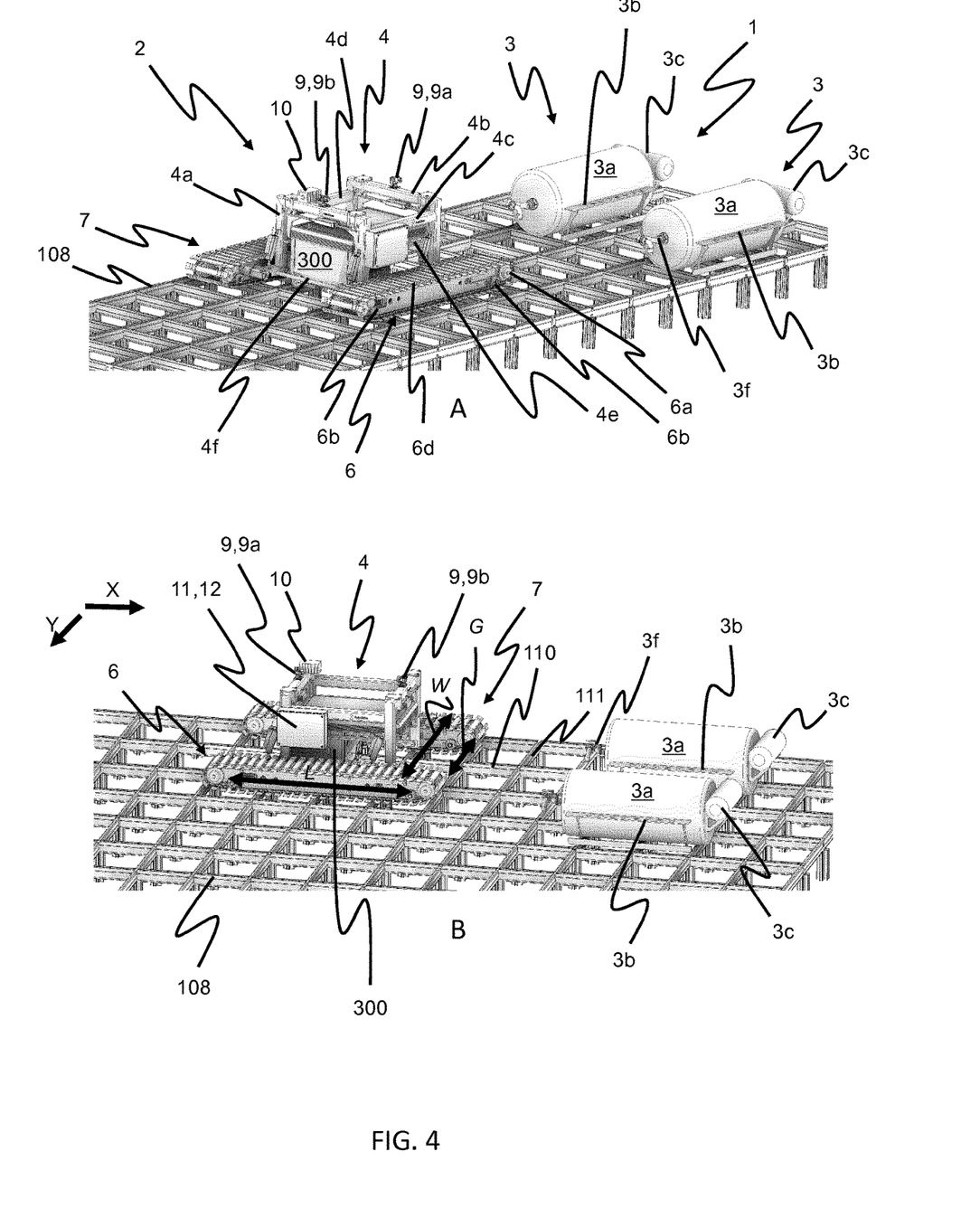
Figure 5:
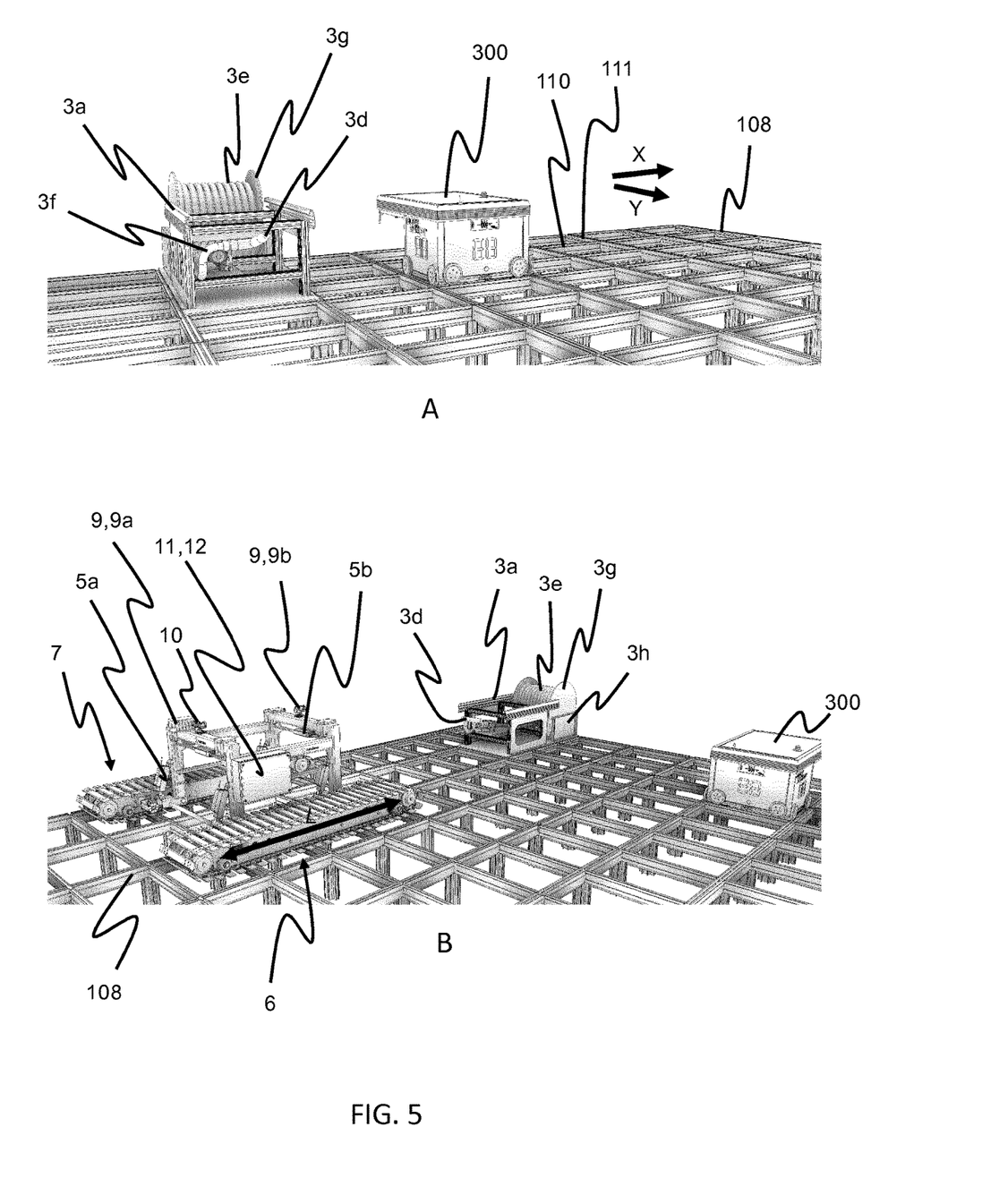
Figure 6:
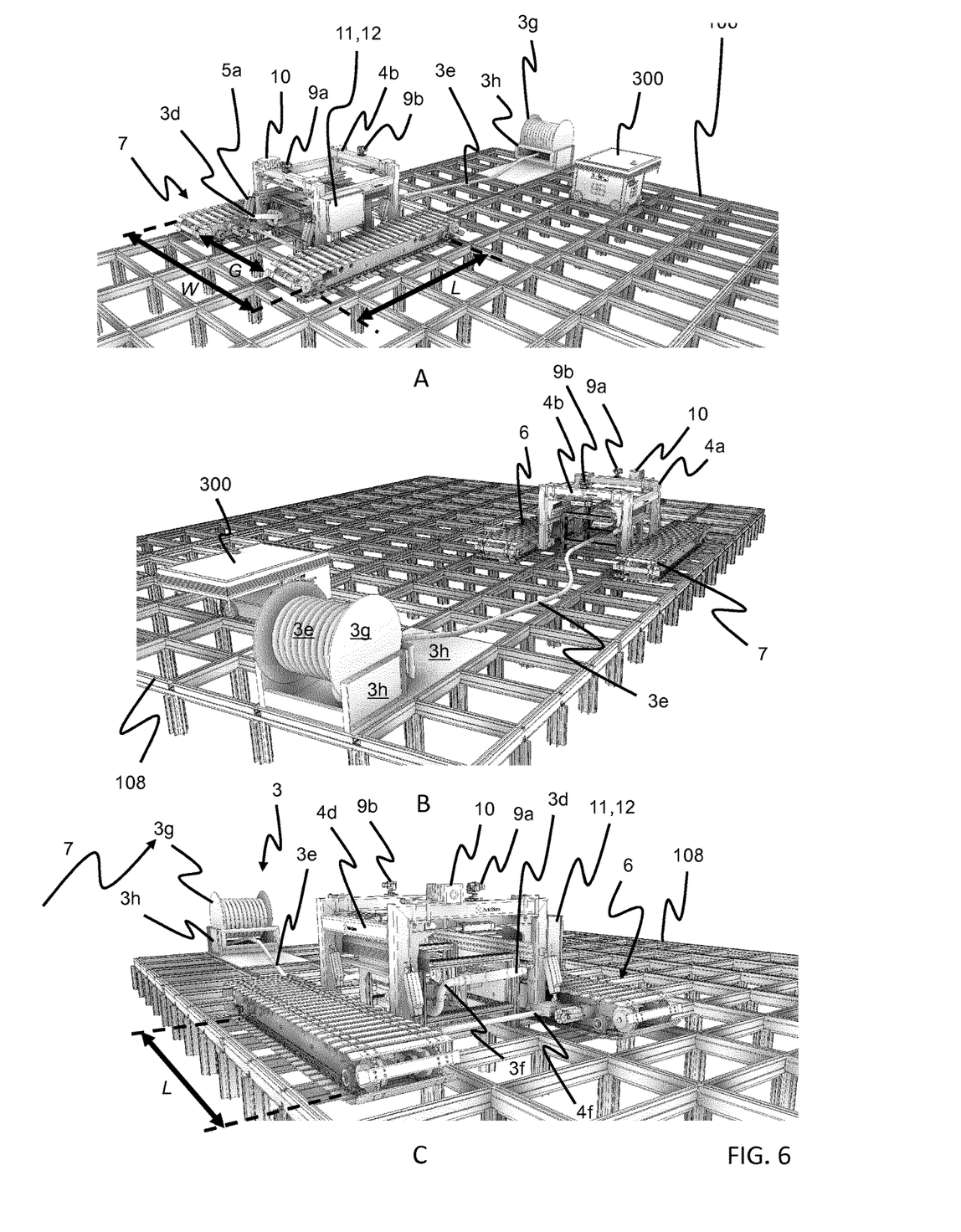
FIGS. 6A-C are different perspective side views of a service vehicle according to the second embodiment containing a fire extinguisher structure, where a supply hose is connected between the fire extinguisher structure and a drum located at the periphery of the rail system.
Figure 7:
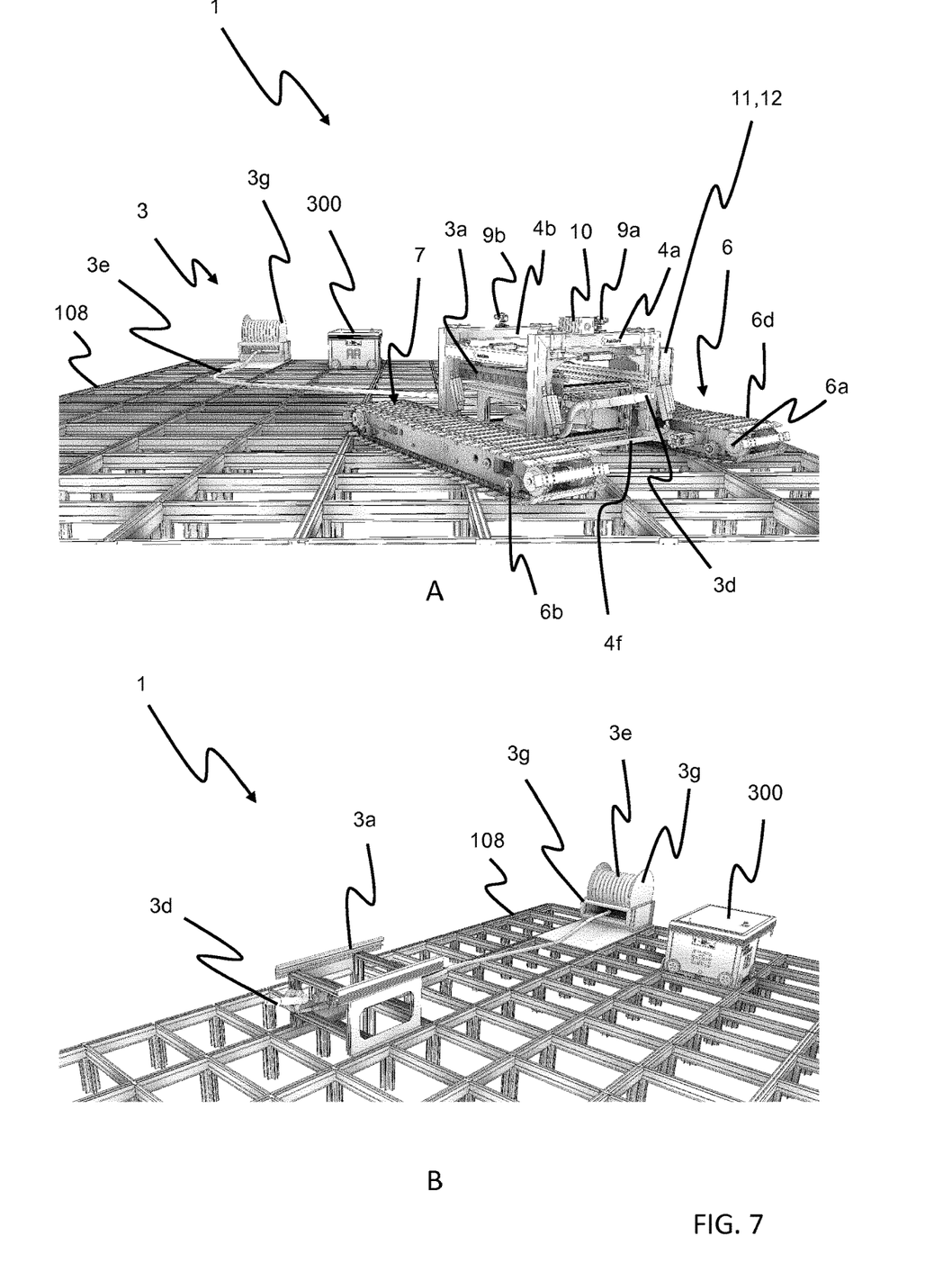
Figure 8:
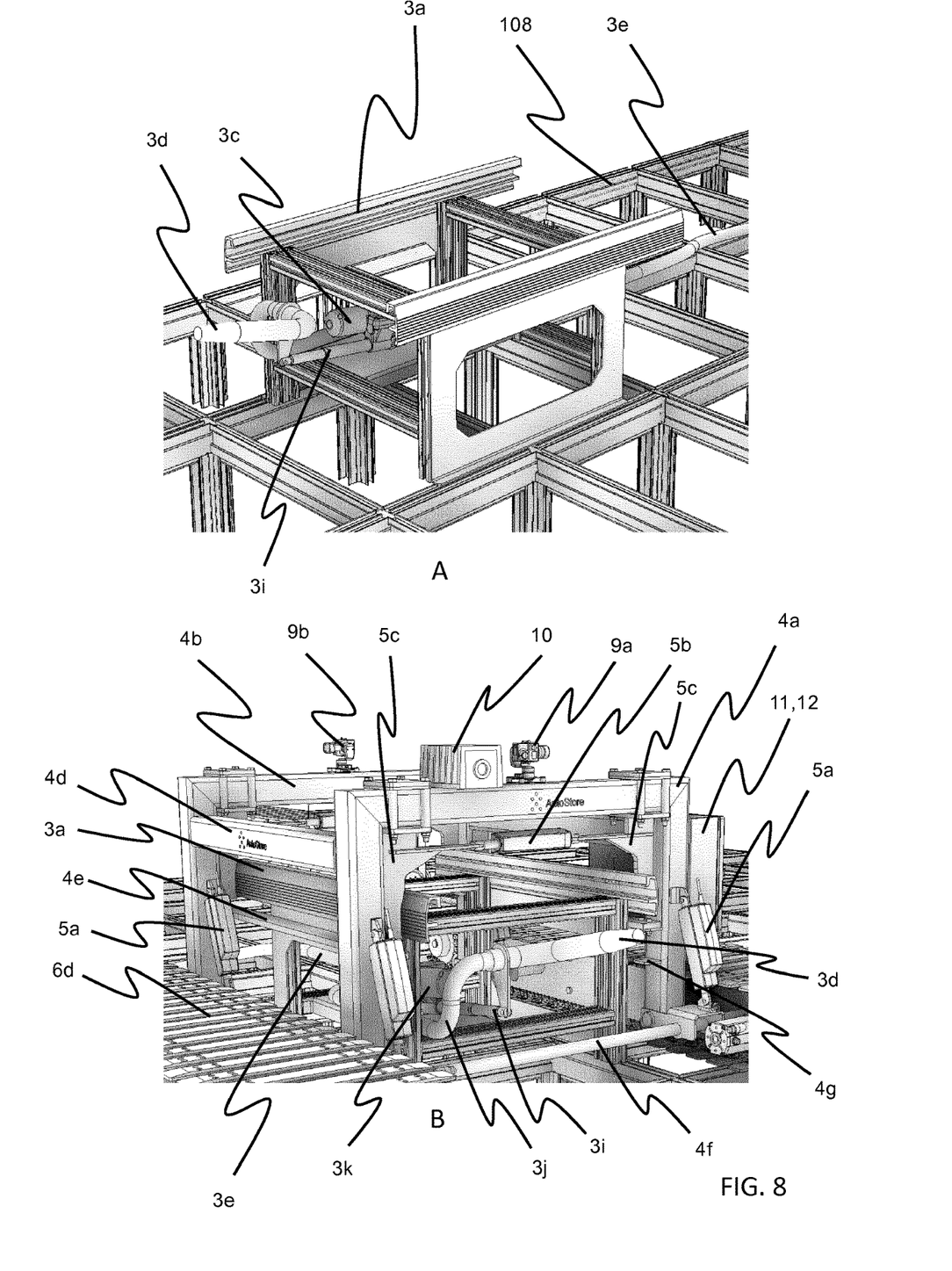

FIGS. 4A and 4B shows an alternative use of the service vehicle 2; to pick up and transport malfunctioning container handling vehicles 200,300 across the rail system 108.

In order to lift the container handling vehicles, 200,300, the claws 5*c* are used to push towards the sides of the vehicle 200,300 using the horizontal actuators 5*b*, followed by an actuation of the vertical actuators 5*a* to lift the service vehicle body 4 (and thereby the vehicle 200,300) away from the rail system 108. Hence, the particular configuration of the service vehicle 2 described above allows the service vehicle 2 to be multifunctional, i.e. both acting as means to extinguish fire on and within a framework structure 100 and means to transport malfunctioning container handling vehicles 200,300. In this alternative use of the service vehicle 2, the opening the guiding beams 3*e* has a minimum width being equal to, or larger than, the overall width of the container handling vehicle(s) 200,300 to be serviced.

The procedure for picking up a container handling device 200,300 by the service vehicle 2 may proceed in the following way:

The service vehicle 2 approaches a position adjacent to the one or more container handling vehicles 200,300 to be transported using signal communication between a remote control system and the one or more of the onboard transmitters/receivers/transducers. If needed, the orientation of the service vehicle 2 is changed so that the vehicle receiving opening of the service vehicle 2 are facing towards the container handling vehicle(s) 200,300.

The service vehicle 2 is remotely guided so that the container handling vehicle 200,300 enters through the receiving opening of the vehicle body 4, between the two caterpillar tracks/rollers 6. Alternatively, the service vehicle 2 may be kept still, and the container handling vehicle 200,300 may be remotely guided into the vehicle receiving opening. The correct horizontal position of the container handling vehicle 200,300 inside the service vehicle body 4 is controlled by the stopper beam 4*f* arranged on the vertical side opposite of the receiving opening. Such a stopper beam 4*f* will also contribute to increase the stability of the container handling vehicle 200,300 within the service vehicle body 4.

The claws 5c are displaced horizontally using the horizontal actuators 5b until the claws 5c make physical contact with the container handling vehicle 200,300.

The vertical actuator 5a is/are remotely operated, causing the service vehicle body 4 to be lifted from the rail system 108 due to the pivoting movement of the pivot support 5d. Due to the established physical contact between the claws 5c and the container handling vehicle 200,300, the latter is lifted from the rail system 108, thereby setting the service vehicle 2 in a transport position.

The service vehicle 2 is moved to its predetermined position on the rail system 108, or out of the rail system 108, with the one or more container handling vehicles 200,300.

The unloading process, i.e. the transport of the one or more container handling vehicles 200,300 by the service vehicle 2 to a predetermined position onto the rail system 108 for regular operation, proceeds equal or similar to the above described loading process, but in reverse sequence.

The above described embodiments are remotely controlled, autonomously driven or a combination of both. However, it may be envisaged embodiments where the full operation of the service vehicle 2 is at least partly due to the operation of an onboard human operator using a manually operated control system onboard the service vehicle which enables control of direction and/or speed.

In the preceding description, various aspects of the fire extinguisher assembly according to the invention have been described with reference to the illustrative embodiment. For purposes of explanation, specific numbers, systems and configurations were set forth in order to provide a thorough understanding of the vehicle and its workings. However, this description is not intended to be construed in a limiting sense. Various modifications and variations of the illustrative embodiments, as well as other embodiments of the vehicle, which are apparent to persons skilled in the art to which the disclosed subject matter pertains, are deemed to lie within the scope of the present invention.

REFERENCE NUMERALS

1 Storage and retrieval system/storage structure
2 Service vehicle
3 Fire extinguisher device
3a Fire extinguisher structure/tank for fire extinguishant
3b Fire extinguisher support/cradle
3c Pump
3e Supply hose
3f Valve
3g Drum
3h Drum support
3i Positioner/nozzle positioner
3j Nozzle/discharge opening
3k Nozzle positioner motor
4 Service vehicle body
4a Front framework
4b Rear framework
4c First horizontal cross beam
4d Second horizontal cross beam
4e Guiding beams
4f Stopper beam
4g Support brackets for fire extinguisher structure/tank
5 Lifting mechanism
5a Vertical actuator
5b Horizontal actuator
5c Attachment device/claw
5d Pivot support
5e Lifting mechanism transducer/receiver
6 First propulsion means/caterpillar track
6a First toothed belt wheel for each endless belt 6,7
6b Second toothed belt wheel for each endless belt 6,7
6c Inner surface of the endless belt 6,7
6d Looped chain/endless belt
7 Second propulsion means/caterpillar track
8 Chamber/Fire extinguisher compartment
9 First inspection unit/image capturing unit
9a Forward camera
9b Rearward camera
10 Second inspection unit/infrared camera
11 Transducer system
12 Power supply/battery
100 Framework structure
102 Upright members of framework structure
103 Horizontal members of framework structure
104 Storage grid/three dimensional grid
105 Storage column
106 Storage container
107 Stack
108 Rail system
110 First set of parallel rails in first direction (X)
111 Second set of parallel rails in second direction (Y)
115 Grid opening
119 Drop-off port column
120 Pick-up port column
122 Grid cell
200 First container handling vehicle
201 Wheel arrangement
300 Second container handling vehicle
301 Wheel arrangement
X First direction
Y Second direction
P Horizontal plane
$L_{gc}$ Length of a grid cell 122
$W_{gc}$ Width of a grid cell 122
$L_{pm}$ Length of propulsion means 6,7
$W_{pm}$ Width of propulsion means 6,7
$G_{pm}$ Spacing between the first and second endless belt 6,7

The invention claimed is:

1. An automated storage and retrieval system comprising a service vehicle having a fire extinguisher compartment for containing firefighting equipment for extinguishing fire on and within the automated storage and retrieval system, wherein the automated storage and retrieval system further comprises:
 a rail system comprising:
  a first set of parallel rails arranged in a horizontal plane and extending in a first direction, and
  a second set of parallel rails arranged in the horizontal plane and extending in a second direction which is orthogonal to the first direction; which first and second sets of rails form a grid pattern in the horizontal plane comprising a plurality of adjacent grid cells of length $L_{gc}$ and width $W_{gc}$, each comprising a grid opening defined by a pair of adjacent rails of the first set of rails and a pair of adjacent rails of the second set of rails;
 a plurality of stacks of storage containers arranged in storage columns located beneath the rail system; and
 a plurality of container handling vehicles for lifting and moving the storage containers stacked in the stacks, wherein the container handling vehicles move laterally on the rail system above the storage columns to access the storage containers via the grid openings, wherein the service vehicle further comprises a caterpillar track configured to drive on top of the rail system by abutting topmost parts of each rail, and the service vehicle moves on the rail system by using the caterpillar track, wherein the caterpillar track has a length $L_{pm}$ at a level of the horizontal plane exceeding a length corresponding to a diagonal length across a maximum grid opening of the rail system when the service vehicle is moving across the rail system.

2. The automated storage and retrieval system in accordance with claim 1, wherein an overall width $W_{pm}$ associated with the caterpillar track exceeds a width of the rails of the rail system when the service vehicle is moving on the rail system.

3. The automated storage and retrieval system in accordance with claim 1, wherein the service vehicle further comprises an inspection unit being configured to allow inspection of surroundings of the service vehicle.

4. The automated storage and retrieval system in accordance with claim 3, wherein the service vehicle further comprises a service vehicle body onto which the caterpillar track is mounted, and wherein the inspection unit comprises:
 a front inspection unit being arranged to allow inspection of the surroundings of the service vehicle within a set angular range around a forward direction of propulsion of the service vehicle; and
 a back inspection unit being arranged to allow inspection of the surroundings of the service vehicle within a set angular range around a backward direction of propulsion of the service vehicle directed opposite of the forward direction.

5. The automated storage and retrieval system in accordance with claim 3, wherein the inspection unit is at least one of:
 a first optical camera for capturing images of the surroundings of the service vehicle using light in a visible spectrum, or
 a second optical camera for capturing images of the surroundings of the service vehicle using light outside the visible spectrum.

6. The automated storage and retrieval system in accordance with claim 1, wherein the service vehicle comprises a fire extinguisher device for extinguishing fire on and beneath the rail system using fire extinguishant.

7. The automated storage and retrieval system in accordance with claim 6, wherein the fire extinguisher device comprises a fire extinguisher structure, and wherein the service vehicle further comprises:
 a service vehicle body onto which the caterpillar track is mounted, wherein the service vehicle body encloses the fire extinguisher compartment for storing a fire extinguisher framework.

8. The automated storage and retrieval system in accordance with claim 7, wherein the fire extinguisher structure comprises a tank for storing the fire extinguishant.

9. The automated storage and retrieval system in accordance with claim 8, wherein the fire extinguisher device further comprises:

a pump for pressurizing the fire extinguishant within the tank; and
 a closable manifold forming a closable fluid communication between an internal volume of the tank and an exterior of the tank.

10. The automated storage and retrieval system in accordance with claim 8, wherein the fire extinguisher device further comprises a fire extinguisher support arranged at or adjacent to an exterior wall of the tank, and wherein the service vehicle body further comprises a support bracket extending into the fire extinguisher compartment,
 wherein the fire extinguisher support and the support bracket are configured such that the fire extinguisher support is supported on the support bracket when the tank is arranged within the fire extinguisher compartment.

11. The automated storage and retrieval system in accordance with claim 7, wherein the fire extinguisher structure comprises a framework having a volume being equal or smaller than the volume of the fire extinguisher compartment,
 wherein the fire extinguisher device further comprises a supply hose for supplying fire extinguishant, and
 wherein a first end of the supply hose is connected in fluid communication with a fire extinguishant reservoir and a second end of the supply hose is connected to the framework such that fire extinguishant is allowed to adjustably exit the supply hose and onto the rail system during operation through an opening of the second end arranged in a vicinity of, or within, the service vehicle body.

12. The automated storage and retrieval system in accordance with claim 11, wherein the fire extinguisher structure further comprises a positioner configured to regulate a position of the opening.

13. The automated storage and retrieval system in accordance with claim 11, wherein the fire extinguisher device further comprises a drum onto which the supply hose is configured to be coiled.

14. The automated storage and retrieval system in accordance with claim 7, wherein the service vehicle body comprises a lifting mechanism for lifting the fire extinguisher structure vertically when stored within the fire extinguisher compartment.

15. A method for operating the automated storage and retrieval system according to claim 1, wherein the method comprises:
 guiding the service vehicle to a first position on the rail system situated within a maximum distance from an outer lateral boundary of a fire located on or below the rail system by operating and controlling the caterpillar track;
 activating a fire extinguisher device of the service vehicle for allowing fire extinguishant to extinguish the fire; and
 positioning a positioner of the fire extinguisher device to direct the fire extinguishant towards or adjacent to the fire.

* * * * *